United States Patent [19]

Meier et al.

[11] Patent Number: 4,853,557
[45] Date of Patent: Aug. 1, 1989

[54] AUTOMOTIVE ALTERNATOR POWER GENERATOR FOR WELDING OR USE OF POWER TOOLS

[76] Inventors: Werner A. Meier, P.O. Box 7086, East London 5200; Stratford Voogt, 49 Pitout Street, Whitfield Boksburg, both of South Africa

[21] Appl. No.: 194,925

[22] Filed: May 17, 1988

[51] Int. Cl.⁴ ............................................. H02J 7/16
[52] U.S. Cl. .................................... 307/10.1; 307/31; 307/38; 219/133; 219/137 PS; 322/8; 363/61
[58] Field of Search .................. 307/10 R, 28, 29, 30, 307/38; 219/137 PS, 133; 322/7, 8, 90; 363/59-61; 320/15

[56] References Cited

U.S. PATENT DOCUMENTS

| | | | |
|---|---|---|---|
| 3,316,416 | 4/1967 | Carlson | 307/10 R |
| 3,770,976 | 11/1973 | Stroud et al. | 307/10 R |
| 3,894,242 | 7/1975 | Helling | 322/7 |
| 4,100,474 | 7/1978 | Pfeffer | 322/90 |
| 4,114,048 | 9/1978 | Hull et al. | 307/53 |
| 4,257,091 | 3/1981 | Kaufman | 363/85 |
| 4,330,715 | 5/1982 | Stroud et al. | 307/10 R |
| 4,599,687 | 7/1986 | Smith | 363/61 |

FOREIGN PATENT DOCUMENTS

| | | | |
|---|---|---|---|
| 2409878 | 11/1978 | France . | |
| 856275 | 8/1985 | South Africa . | |
| 930538 | 5/1982 | U.S.S.R. | 363/61 |
| 2193395 | 2/1988 | United Kingdom | 219/137 PS |

Primary Examiner—William H. Beha, Jr.
Attorney, Agent, or Firm—Cushman, Darby & Cushman

[57] ABSTRACT

An electrical power supply used on a motor vehicle is interconnected with the vehicle battery, alternator and regulator. The power supply includes a voltage multiplier for multiplying the rectified output voltage from the alternator, and welding sockets for facilitating a welding operation. A multi-pole switch exclusively selects the operating mode of the power supply from among normal battery charging, power appliance operation and welding.

11 Claims, 5 Drawing Sheets

AUTOMOTIVE ALTERNATOR POWER GENERATOR FOR WELDING OR USE OF POWER TOOLS

BACKGROUND OF THE INVENTION

The invention is directed to an apparatus, for use with a standard automobile alternator, which selectively enables welding, operation of power tools, or conventional use of the alternator as the vehicle battery charger.

The invention is based on a simply modified motor vehicle alternator in which the output can be switched to either provide welding current, D.C. power suitable to operate power tools, or charging current for the vehicle battery (in the normal mode).

Prior art devices, such as U.S. Pat. No. 4,330,715 to Stroud et al and U.S. Pat. No. 4,599,687 to Smith have disclosed voltage doubling circuits connected to the windings of a modified motor vehicle alternator. These devices effectively increase the output voltage by employing large capacitors and power diodes, to a level sufficient to drive power tools, as well as by the use of switches to effect change from one operation mode to the other.

Smith employs a 3 phase two stage voltage doubling circuit using 6 large capacitors and 8 power diodes. The alternator regulator, however, is not a standard vehicle type, but rather is specially designed for the arrangement of the Smith device. Accordingly, should the Smith unit fail, there is no back up and the battery will either not charge or overcharge and suffer damage.

The Smith circuit is disadvantageous, because of its large number of hard wired power components, which results in a high manufacturing cost and high circuit complexity with the attendant associated increased risk of failure.

Another disadvantage of the Smith device is that the voltage multiplier is permanently connected to the alternator A.C. winding, even during normal running of the alternator. Since the Smith device is not isolated from the alternator the capacitors are kept charged while the vehicle is running. Thus, a failure in the Smith device during normal operation of the vehicle could result in vehicle failure.

A still further disadvantage of the Smith device is that it has no provision for regulating the welding voltage output.

Stroud et al employs a single stage voltage doubling circuit and similarly to Smith employs a non-standard voltage regulator. Although Stroud et al achieves a low component count, it does not supply sufficient power to drive 220 and 240 volt power tools due to the single stage doubling circuit.

Another disadvantage of the Stroud et al device is that it retains the welding socket connections 41 and 43 to the same points as the power socket R1. Connection of the appliance or power tool, during the welding mode, to the power socket could result in damage to the appliance due to low voltage.

A still further disadvantage of the Stroud et al device is that it has no provision for regulating the 110 volt output or the welding voltage output.

And finally, both the Smith and Stroud et al prior art devices are disadvantageous, because they fail to provide adequate safety and equipment protection circuits or devices.

SUMMARY OF THE INVENTION

The invention is directed to a device for operating power tools and is used in conjunction with a pulley driven alternator having a three phase output. The alternator is a standard motor vehicle alternator, which is connected to a three phase full wave bridge rectifier and a standard voltage regulator for controlling the output of the alternator for normal battery charging. Two alternator phases are connected to a capacitive voltage multiplier circuit for outputting 120 volt or 240 volt DC power. The output voltage is detected and maintained at the required output voltage, by means of a series regulator circuit, connected to the vehicle battery, for controlling the current supplied to the field (rotor) winding of the alternator.

The voltage multiplier circuit comprises two stages of voltage doubling. A first pair of series connected capacitors is connected across the positive and negative terminals of the rectified alternator output. A first blocking diode is provided with its anode connected to the positive pole of the rectified alternator output and a second blocking diode is provided with its cathode connected to the negative pole of the rectified alternator output. A second pair of series connected capacitors serves as the output capacitors and is connected between the cathode and anode, respectively, of the first and second blocking diodes. Either end of one of the alternator windings is connected between the first and second pair of series connected capacitors.

In contrast to the prior art described above, the invention solves the safety and equipment protection problems yet achieves the best combination of:

(1) Low component count, (associated reliability and low cost);
(2) Good power output (voltage at 120 V or 240 V DC);
(3) Effective single switch arrangement (multipole);
(4) Use of the standard alternator regulator resulting in a simpler alternator modification (only required to change to a delta configuration with two extra wires brought out);
(5) Complete protection of overload and both voltage and current indication as well as welding voltage regulation for safety;.
(6) Permits two or more units to be operated in parallel to increase the power output;
(7) Employs 2 power diodes and 4 capacitors in its basic form—a simple arrangement which does not compromise the output power of the unit;
(8) A voltage sensing circuit connected across the output capacitors indicates, by means of an illuminating light emitting diode (L.E.D.), the actual output voltage;
(9) A current sensing circuit connected in series with the negative leg of the output of the voltage multiplier indicates an over current condition by illuminating an L.E.D.;
(10) A voltage detecting circuit connected across the output of the voltage doubling circuit controls, by means of a series connected regulator, the current to the alternator field (rotor) supplied via the existing alternator regulator and hence the output voltage;
(11) A voltage detecting circuit connected across the welding sockets controls, by means of the series connected regulator, the current to the alternator field (rotor) and hence the open circuit welding voltage;

(12) A temperature sensing circuit detects the components working temperatures and, by means of the series regulator, shuts down the unit if temperature exceeds a preset limit;

(13) A single multipole switch connects the voltage multiplying circuit, as well as the regulator with its associated circuitry, to the output of the alternator via three poles for power tools or in its mid position disconnects all of the poles to enable welding or in the third position bypasses the series regulator circuit and connects the battery to the rectified alternator output for normal battery charging; and (14) An ignition lamp circuit provided for connection to the vehicle ignition lamp indicates that the vehicle battery is being charged.

All of the above described components are housed in a small enclosure and suitably laid out to enable effective operation of power sockets, welding sockets and the multipole switch. The welding sockets are arranged so that the multipole switch handle obscures the welding sockets except when the switch is in the welding mode position.

DETAILED DESCRIPTION OF THE INVENTION

Figure 1:
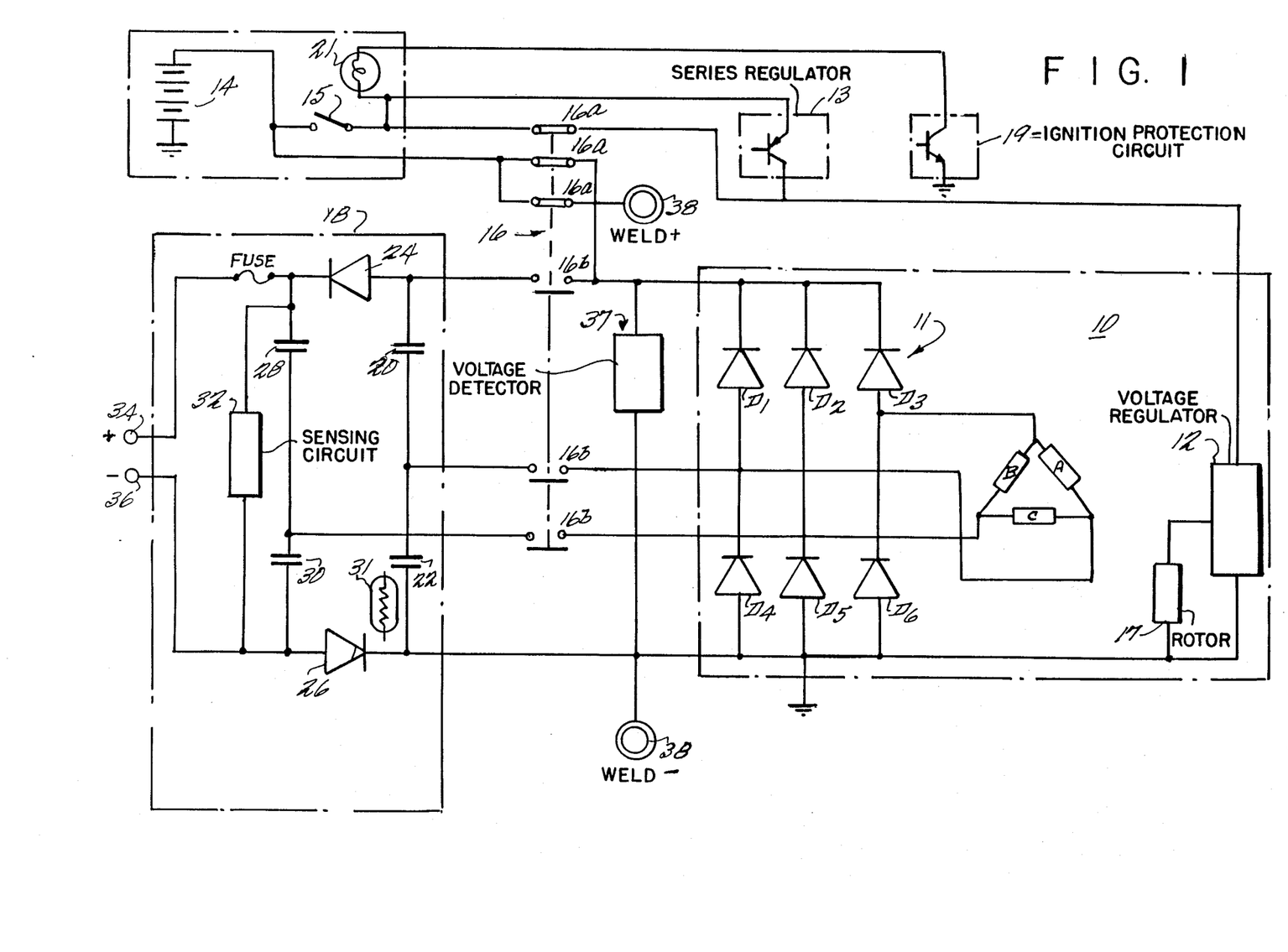
FIG. 1 is a schematic diagram of the invention, showing connections to a standard vehicle alternator being used as a power generator.

As shown in FIG. 1, motor vehicle alternator 10 has three output windings A, B and C connected in a delta configuration. The windings A, B and C are connected to a standard built in three phase full wave rectifier diode bridge 11 comprising six diodes D1 to D6, which provides a rectified D.C. 10 output at points 38+ and 38−.

The peak open circuit alternator voltage output develops 60 V AC across each output winding, with alternator rotor 17 spinning at its nominal operating speed of about 7000 RPM and alternator 10 fully excited. Voltage regulator 12 is connected across battery 14 via series regulator 13 and vehicle ignition switch 15. When battery 14 is disconnected from the rectified alternator below 12.6 V. Regulator 12 will sense low Voltage and turn full on, thereby supplying full excitation to alternator 10.

Battery 14 is normally connected via switch 16 to the rectified alternator output, whereby battery 14 is charged and as regulator 12 senses its voltage it controls the alternator output in the normal manner by shutting off at about 14 V. One pole of switch 16 is in parallel with series regulator 13 and in the normal mode shorts it out.

Figures 4, 5:
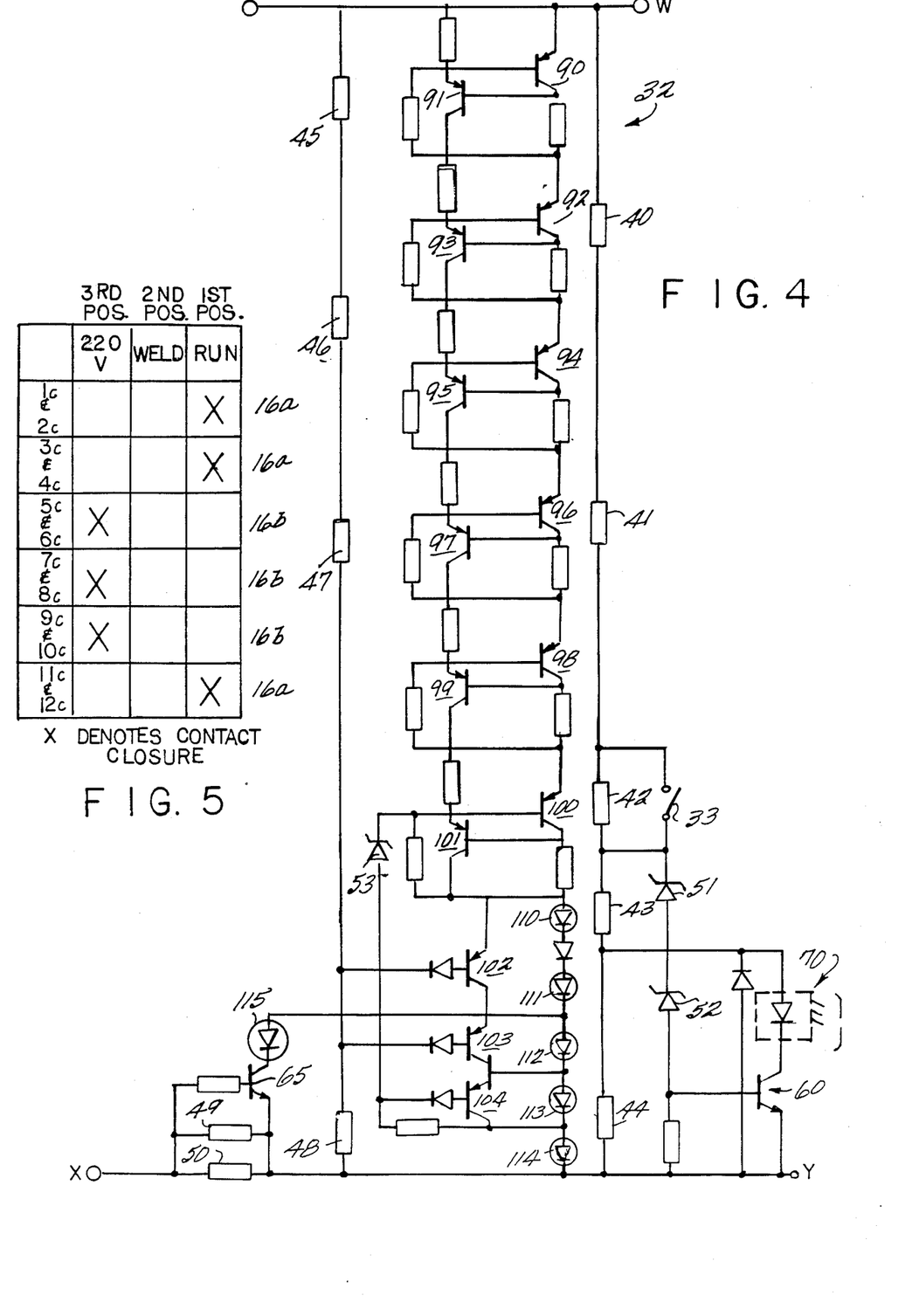
FIG. 5 is switch contact chart showing open and closed contacts for the positions of the switch.

Switch 16 has two other positions and in one all poles are open, as shown in FIG. 5, and welding can be carried out from terminals 38+ and 38−, which are welding sockets. In this position, voltage regulator 12 connects to battery 14 via series regulator 13 and ignition switch 15. Since battery 14 is disconnected from the rectified alternator output, regulator 12 "sees" low voltage and fully excites alternator 10 providing about 80 to 100 V DC at terminals 38+ and 38− for direct welding. In this position, series regulator 13 would, by means of the welding voltage detector circuit, regulate the excitation to 80 V DC maximum, as will be described in detail below.

In its third position, switch 16 selects power to operate power tools. More particularly, voltage multiplier 18 is connected to the rectified alternator output via three poles 16b, of switch 16, the poles 16a remaining open. Voltage multiplier circuit 18 supplies a nominal 220 V or 110 V DC output to power tools, such as drilling machines and other tools or devices capable of utilizing DC power.

The input to voltage multiplier circuit 18 is derived both from the output of diode bridge 11 and directly from the alternator stator windings. Voltage multiplier circuit 18 comprises first pair of series connected capacitors 20, 22, pair of diodes 24, 26 and second series connected pair of capacitors 28, 30. Capacitors 20, 22, 28 and 30 are each rated at 470 F and 385 to 250 volts. Diodes 24 and 26 are rated at 50 amps and 300 V P.I.V.

The anode of diode 24 is connected to the positive pole of alternator diode bridge 11 while the cathode of diode 26 is connected to the negative pole of alternator diode bridge 11. The output of voltage multiplier circuit 18 appears at positive terminal 34 and negative terminal 36. The two ends of output winding C of alternator 10 are connected to a point intermediate capacitors 20 and 22 and capacitors 28 and 30, respectively.

Figure 2:
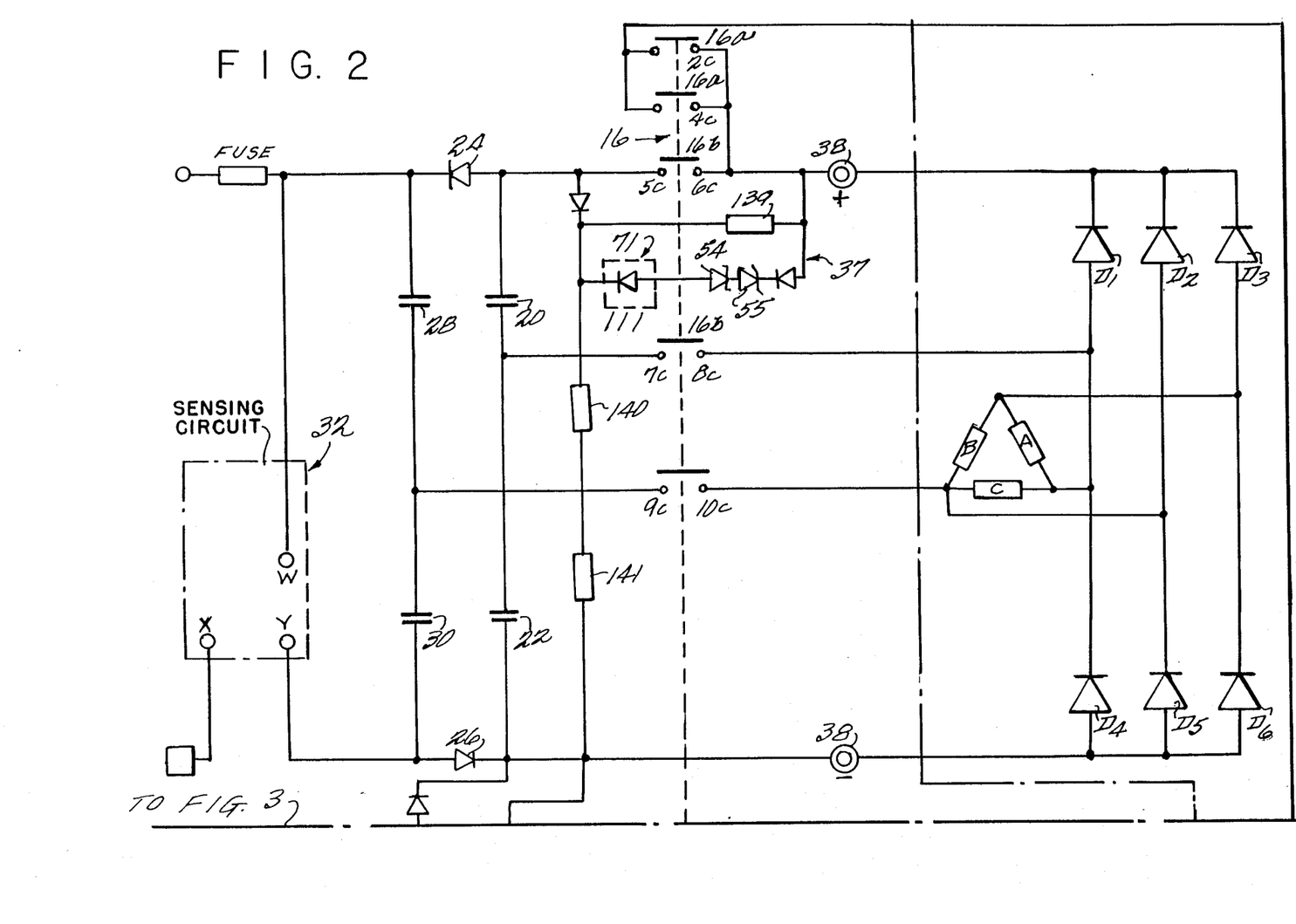
FIGS. 2–4 are circuit diagrams showing in greater detail the connections and arrangements of the circuitry employed in the invention, including the vehicle alternator, battery, ignition switch and ignition lamp relative positions and actual connections to the invention.
Figure 3:
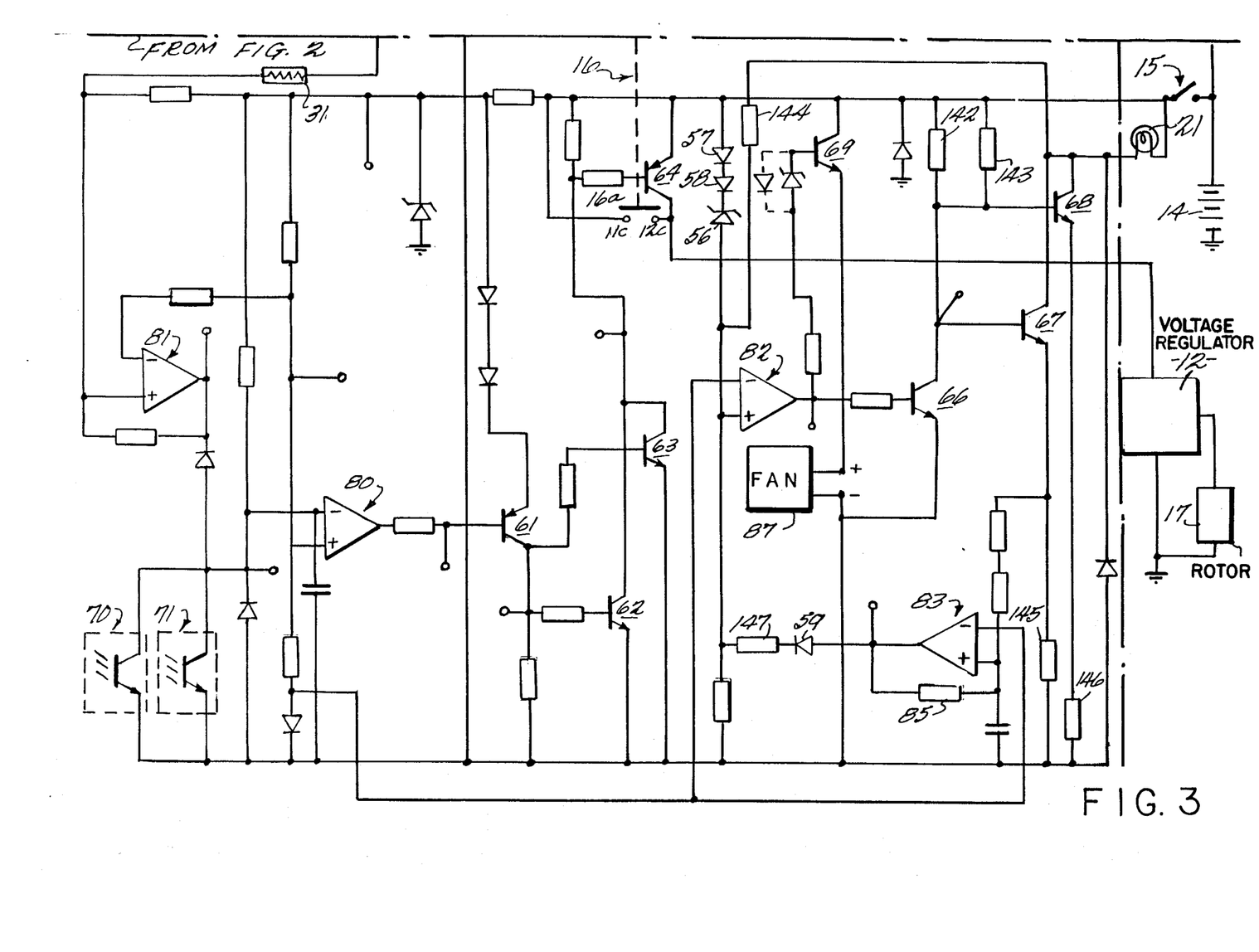

Operation of the power generator will now be described with reference to FIGS. 2–4. Assuming that switch 16 is in the tool operating or third position with poles 16b closed and poles 16a open, vehicle battery 14 is disconnected from output diode bridge 11 of alternator 10 and voltage multiplier circuit 18 is connected to both the output terminals of alternator diode bridge 11 and alternator winding C.

When rotor 17 of alternator 10 rotates, it causes an alternating voltage (AC current) waveform to be produced in each of the three output windings A, B and C of alternator 10, with all three waveforms being out of phase with each other by 120 degrees. Considering winding A first, the nominally positive half cycle of the wave form in winding A charges capacitor 20 via diode D3 to the peak voltage of the wave form. On the next negative half cycle in winding A, capacitor 22 will be charged via diode D6 to the negative peak voltage of the wave form.

Since capacitors 20 and 22 are in series the voltage across the series pair will be double the peak voltage of the alternating current wave form in winding A. In a similar manner, the alternating current wave form in winding C will charge capacitors 28 and 30.

When winding C, has a nominally positive half cycle of the wave form, it charges capacitor 28 via capacitor 20 and diode 24. Capacitor 28 at this moment is connected effectively across alternator winding C and capacitor 20 in series and will therefore charge up to the sum of the peak voltage of the alternator current wave form in winding C and the voltage across capacitor 20. This results in a voltage across capacitor 28 equal to 2 times the voltage across capacitor 20.

During the negative half cycle in winding C, blocking diode 24 prevents the discharge of capacitor 28 and diodes D1 to D3 prevent discharge of capacitor 20. In a similar manner, during the negative half cycle of the wave form in winding C, capacitor 30 is charged via diode 26 and capacitor 22. Again, at this moment, capacitor 30 is effectively connected across the series connected capacitor 22 and alternator winding C, and therefore charges to the sum of the voltage across capacitor 22 and the peak voltage across alternator winding C. This results in a voltage across capacitor 30 equal to 2 times the voltage across capacitor 22.

During the positive half cycle in winding C, blocking diode 26 prevents the discharge of capacitor 30 and diodes D4 to D6 prevent discharge of capacitor 22. Since capacitors 28 and 30 are connected in series and because the voltage in each of the capacitors is double that of capacitors 20 and 22, respectively, the total voltage across the pair of series connected capacitors 28 and 30 will be four times the peak AC voltage across a winding of alternator 10.

The voltage across series connected capacitors 28 and 30 appears at output terminals 34+ and 36− and is prevented from being discharged back into the circuit by blocking diodes 24 and 26. The above description represents the basic principle of operation, however, the actual voltage obtained at output terminals 34 and 36 depends on the alternator characteristics. In particular, the voltage obtained depends on the alternator excitation current, rotor speed, nature of load connected and the size of capacitors 20, 22, 28 and 30.

As shown in FIG. 4, the output across capacitors 28 and 30 is detected by a voltage sensing circuit 32 comprising the voltage divider, formed by resistors 40 to 44 and Zener diodes 51 and 52, which by means of transistor 60 and opto coupler 70, controls the input to series regulator 13 and adjusts the excitation current to alternator 10.

The operation of voltage sensing circuit 32 will now be described. Once sufficient voltage appears at output terminals 34+ and 36−, so as to pass current through Zener diodes 51 and 52, forward bias transistor 60 and pass current through opto coupler 70, the transistor part of opto coupler 70 will ground the inverted input of integrated circuit 80 causing is output to go to 12 V.

This also causes transistors 61–64 (of series regulator 13) to turn off. This in turn reduces excitation current to the field, reduces the output voltage across terminals 34+ and 36− until the preset voltage or equilibrium set by voltage divider 40–44 is achieved, thereby regulating the output voltage.

Switch 33 across resistor 42 selects between 120 or 240 volts output at terminals 34+ and 36−. More particularly, if switch 33 is closed shorting out resistor 42, then opto coupler 70 will control the output to 120 volts. To the contrary, if switch 33 is open then opto coupler 70 will control the output to 240 volts.

During the power mode while switches 16b are closed and high current is drawn, the capacitors are subject to high ripple currents and as such are not continuously rated. Capacitors 20 and 22 are working the hardest and thus are heating more rapidly than capacitors 28 and 30. Attached to capacitor 22 is an N.T.C. thermistor 31 which is connected to the input of integrated circuit 81. As the temperature of capacitor 22 rises beyond a preset point, the reduced resistance of thermistor 31 eventually causes the output of comparator integrated circuit 81 to switch from 12 V to 0 V and again ground the inverting input of integrated circuit 80, thereby again shutting down the series regulator 13 by turning off transistor 64.

Also connected across output capacitors 28 and 30 is a voltage indicating circuit comprising transistors 90 to 104. The circuit consists of six series connected constant current circuits to enable effective sharing of the voltage across them as they must effectively indicate from 12 V to 220 V.

Power for L.E.D.s 111 to 115 is provided by the six stages of constant current source (an active voltage dependent resistor) and voltage detection is via Zener diode 53 and the voltage divider formed by resistors 45 to 48. L.E.D.s 111 to 114 provide indication of the output voltage.

In series with the negative output leg are resistors 49 and 50 in parallel. Once the output current increases beyond a preset value determined by the resistance of resistors 49 and 50, transistor 65 becomes forward biased and L.E.D. 115 illuminates indicating overload.

In the welding mode, with all of poles 16a and 16b of switch 16 open, welding voltage detector 37 becomes active. It is effectively bridged out in the power mode by contacts 5c and 6c, of switch 16, shunting resistor 139. This circuit ensures that the open circuit welding voltage does not exceed the required safety levels as set out in the industrial safety codes.

With switch 16 set so that all poles are open, and with alternator diode bridge 11 connected to welding terminals 38+ and 38−, welding can be carried out directly. The welding current available depends on the alternator excitation characteristics and alternator rotor speed. Since, during welding, voltage multiplier 18 is completely disconnected from the circuit, there are no losses in this circuit.

Welding voltage detector 37 comprises the voltage divider formed by resistors 139 to 140. When the voltage increases to the point where sufficient voltage drop across 139 causes current to flow through Zener diodes 54 and 55 and opto coupler 71, the transistor part of opto coupler 71 grounds the inverting input of integrated circuit 80. This causes the output of integrated circuit 80 to go high, thereby shutting off transistors 61–64 (of series regulator 13) and thus controlling the open circuit welding voltage.

Since transistor 64 is in series with standard alternator regulator 12 (fitted to alternator 10), during normal battery charging voltage sensing detector 32 senses no voltage as poles 16b of switch 16 are open. Accordingly, transistor 64 is driven hard on, thereby dissipating very little power and having a voltage drop of 0.2 volts. This enables standard regulator 12 to sense the battery voltage and regulate accordingly.

When switch poles 16a, of switch 16, are closed across transistor 64, this also ensures a low resistance path for good electrical connection of battery 14 directly to standard regulator 12.

When the unit is supplying 220 V D.C. power, battery 14 is disconnected from the output diodes of alternator 10, transistor 64 regulates according to the output voltage at terminals 34+ and 36− and standard regulator 12, sensing low battery voltage, turns hard on and the excitation regulation is effectively handed over. Accordingly, the appropriate regulator naturally controls the excitation of alternator 10.

During the supply of power from terminals 34+ and 36−, as load is drawn, the voltage at these terminals has a certain amount of ripple and this ripple increases as the load is increased. This ripple is carried through the opto couplers 70 and 71 to series regulator 13. This causes transistor 64 to either switch very lightly on under no load conditions (very little heat dissipated) or under load conditions operates almost as a chopper circuit, either being hard on or off due to the ripple and general stability of the control circuits.

This chopper action has no ill effect on the output due to its high frequency and the longer magnetic circuit delays associated with the excitation. This results in very little heat being dissipated from series regulator 13. When transistor 64 is hard on and drawing 4 amps, the voltage drop across it is about 0.2 V due to the high transistor drive current.

The vehicle's ignition lamp circuit generally becomes unserviceable once the vehicle is fitted with a power unit. However, in order to overcome this problem an ignition protection circuit 19 has been provided, the operation of which will now be described.

A battery voltage detecting circuit, comprising diodes 57 and 58 and Zener diode 56, is connected to the non-inverting input of comparator integrated circuit 82. If the battery voltage is low, the non-inverting input of integrated circuit 82 is 0 V, causing the output to be 0 V and turning off transistor 66. This allows transistors 67 and 68 to be turned on via resistors 142 and 143. Transistors 67 and 68, in turn, complete the circuit across vehicle ignition lamp 21 causing the lamp to illuminate.

If the battery voltage exceeds 13.5 V, battery 14 is fully charged and this causes the noninverting input of integrated circuit 82 to become positive. As a result, the output of integrated circuit 82 becomes positive 12 V, which turns on transistor 66, thereby grounding the bases of transistors 67 and 68. Thus, transistors 67 and 68 turn off extinguishing the ignition lamp.

Connected to the collectors of transistors 67 and 68 is a resistor 144 which provides positive feed back to integrated circuit 82 and therefore some switching hysterises, thereby eliminating ignition light flicker. Connected between the emitters of transistors 67 and 68 and ground are series resistors 145 and 146, respectively.

The voltage developed across resistors 145 and 146 is dependent on the current which flows therethrough. This voltage is fed to the non-inverting input of comparator integrated circuit 83 and if it exceeds 0.6 V, which presents 500 Ma, it will cause the output of integrated circuit 83 to go to 12 V. This provides positive voltage, via diode 59 and resistor 147, to the non-inverting input of integrated circuit 82, again causing the ignition lamp to extinguish.

Positive feedback is provided to integrated circuit 83 via circuit 85, which can comprise, for example, a resistor in series with a diode. The positive feedback acts to latch integrated circuit 83 in the event of an overload and must be reset by power removal.

This circuit thus protects transistors 67 and 68 against destruction, by shutting down in the event of an overload resulting from ignition lamp 21 being wired directly to the battery positive of too excessive a load. Accordingly, this circuit provides ignition lamp over current protection.

Figure 6:
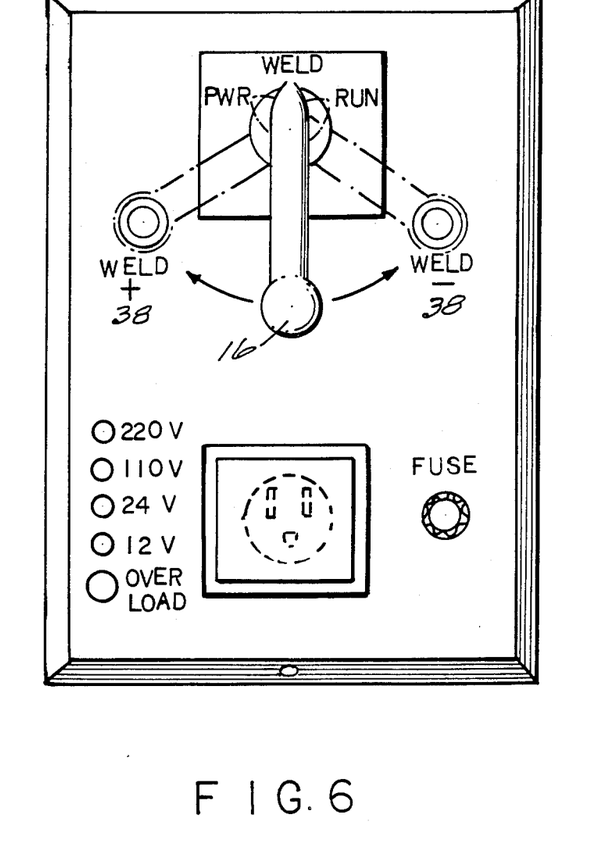
FIG. 6 is a front physical view of the invention.

FIG. 6 shows the handle of switch 16 in the weld position so that welding sockets 38+ and 38− are exposed. If switch 16 is moved to either the power (PWR) or run positions one of the welding sockets will be obstructed. Accordingly, this switch configuration safeguards against welding being performed with switch 16 being in position for operating a power tool or normal charging of the vehicle battery.

Finally provision is made for power cooling fan 87 to turn on via transistor 69, which is designed to operate power cooling fan 87 only when the unit is not in the normal charging mode, i.e., poles 16a of switch 16 are open. In addition, the fan is only operated when the output of integrated circuit 82 is at 0 volts, i.e., when the ignition lamp is on.

The fan is typically a small 12 volt wafer fan and draws only about 200 ma. It provides a measure of security during heavy and continuous duty of the unit. Provision is made for the unit to operate from 12 or 24 V D.C. battery powered vehicles and alternators and to provide outputs of 120 V or 240 V D.C.

It should be appreciated that the abovedescribed description of the presently preferred embodiment does not limit the scope of the present invention in any way, and that various changes and modifications may be made without departing from the spirit and scope of the present invention. For example, although the handle of switch 16 has been used to prevent welding when the normal battery charging (run) or power appliance operation modes have been selected alternatively additional switch contacts could be wired out to deenergize the welding sockets during non-welding operations and to energize the welding sockets during a welding operation. Other variations and modifications will be apparent to those skilled in the art.

What is claimed is:

1. An electrical power supply for use with a motor vehicle, said power supply being interconnected with the vehicle battery, delta connected alternator and voltage regulator, said power supply comprising:
   voltage multiplier circuit means switchably connected to a rectified output voltage from the vehicle delta connected alternator for multiplying the rectified output voltage and having power output connector terminals for facilitating operation of a power appliance;
   welding connection sockets connected to the vehicle alternator for facilitating a welding operation; and
   switch means for selecting any one of a normal battery charging operation, the power appliance operation or the welding operation, said switch means connecting said voltage multiplier circuit means to said rectified output only when selecting the power appliance operation, said switch means providing said welding connection sockets for the welding operation only when selecting the welding operation, and said switching means preventing the power appliance operation and welding operation from occurring when selecting the normal battery charging operation.

2. An electrical power supply as in claim 1, further including voltage sensing means for detecting and regulating the multiplied rectified output voltage from said voltage multiplier circuit means.

3. An electrical power supply as in claim 1, further including welding voltage detector means for detecting and regulating welding voltage at said welding socket connections.

4. An electrical power supply as in claim 1, further including vehicle ignition circuit means for maintaining a vehicle ignition lamp circuit operational for all positions of said switch means and for providing vehicle lamp over current protection.

5. An electrical power supply as in claim 2, further including a series regulating means connected in series between the vehicle battery and voltage regulator for operating in conjunction with said voltage sensing means to regulate the multiplied rectified voltage output by regulating excitation current to the vehicle alternator.

6. An electrical power supply as in claim 5, further including over temperature cut out circuit means for protecting said voltage multiplier circuit means from excessive heat by monitoring heat buildup in said voltage multiplier circuit means and in response thereto causing said series regulating means to reduce the excitation current to the vehicle alternator.

7. An electrical power supply as in claim 1, said voltage multiplier circuit means comprising a first pair of series-connected capacitors connected across positive and negative poles of the rectified alternator output, a first blocking diode with its anode connected to the positive pole of the rectified alternator output, a second blocking diode with its cathode connected to the negative pole of the rectified alternator output, and a second pair of series-connected capacitors connected between the cathode and anode, respectively, of the first and second blocking diodes, with opposite ends of one of the three alternator windings from the delta connected alternator being connected intermediate the respective capacitors of the first and second pairs of series-connected capacitor.

8. An electrical power supply for use with a motor vehicle, said power supply being interconnected with the vehicle battery, delta connected alternator and voltage regulator, said power supply comprising:
   voltage multiplier circuit means switchably connected to a rectified output voltage from the vehicle delta connected alternator for multiplying the rectified output voltage and having power output connector terminals for facilitating operation of a power appliance;
   welding connection sockets connected to the vehicle alternator for facilitating a welding operation; and
   switch means for selecting any one of a normal battery charging operation, the power appliance operation or the welding operation;
   voltage sensing means for detecting and regulating the multiplied rectified output voltage from said voltage multiplier circuit means; and
   series regulating means connected in series between the vehicle battery and voltage regulator for operating in conjunction with said voltage sensing means to regulate the multiplied rectified voltage output by regulating excitation current to the vehicle alternator.

9. An electrical power supply as in claim 8, further including welding voltage detector means for detecting and regulating welding voltage at said welding socket connections.

10. An electrical power supply as in claim 8, further including vehicle ignition circuit means for maintaining a vehicle ignition lamp circuit operational for all positions of said switch means and for providing vehicle lamp over current protection.

11. An electrical power supply as in claim 8, said voltage multiplier circuit means comprising a first pair of series-connected capacitors connected across positive and negative poles of the rectified alternator output, a first blocking diode with its anode connected to the positive pole of the rectified alternator output, a second blocking diode with its cathode connected to the negative pole of the rectified alternator output, and a second pair of series-connected capacitors connected between the cathode and anode, respectively, of the first and second blocking diodes, with opposite ends of one of the three alternator windings from the delta connected alternator being connected intermediate the respective capacitors of the first and second pairs of series-connected capacitors.

* * * * *